United States Patent [19]
Steffens, Jr.

[11] Patent Number: 5,294,150
[45] Date of Patent: Mar. 15, 1994

[54] PRETENSIONING SAFETY BELT APPARATUS

[75] Inventor: Charles E. Steffens, Jr., Washington, Mich.

[73] Assignee: TRW Vehicle Safety Systems Inc., Lyndhurst, Ohio

[21] Appl. No.: 939,939

[22] Filed: Aug. 31, 1992

[51] Int. Cl.$^5$ .................. B60R 21/20; B60R 22/46
[52] U.S. Cl. .................. 280/801 A; 280/806; 297/480
[58] Field of Search .......... 280/801, 808, 801 A, 280/806; 297/480, 483

[56] References Cited

U.S. PATENT DOCUMENTS

| | | | |
|---|---|---|---|
| 3,871,683 | 3/1975 | Otani | 297/480 |
| 3,901,531 | 8/1975 | Prochazka | 297/480 |
| 4,006,934 | 2/1977 | Murakami et al. | 297/480 |
| 4,008,909 | 2/1977 | Otani et al. | 297/480 |
| 4,152,025 | 5/1979 | Bendler et al. | 280/806 |
| 4,469,351 | 9/1984 | Matsuoka | 280/806 |
| 4,615,540 | 10/1986 | Sedlmayr et al. | 280/806 |
| 4,667,904 | 5/1987 | Herndon | 280/806 |
| 4,846,498 | 6/1989 | Fohl | 280/801 A |

FOREIGN PATENT DOCUMENTS 3833543  5/1989  Fed. Rep. of Germany ...... 280/808
2243533 11/1991  United Kingdom .

Primary Examiner—Karin L. Tyson
Attorney, Agent, or Firm—Tarolli, Sundheim & Covell

[57] ABSTRACT

A length of shoulder belt webbing is extensible around the torso of a vehicle occupant to restrain forward movement of the vehicle occupant in the vehicle. A webbing guide guides the belt webbing around the body of the vehicle occupant. In response to vehicle deceleration at a rate above a predetermined rate, a pyrotechnic charge directs gas under pressure into an expansible chamber to move the webbing guide upward on the vehicle to tension belt webbing extending through the webbing guide. A gas outlet enables controlled flow of gas out of the expansible chamber to allow controlled downward movement of the webbing guide under tension in the belt webbing resulting from forward movement of the vehicle occupant subsequent to upward movement of the webbing guide. The webbing guide may be height adjustable by the vehicle occupant. The pyrotechnic charge may be connected with the webbing guide for movement with the webbing guide.

23 Claims, 7 Drawing Sheets

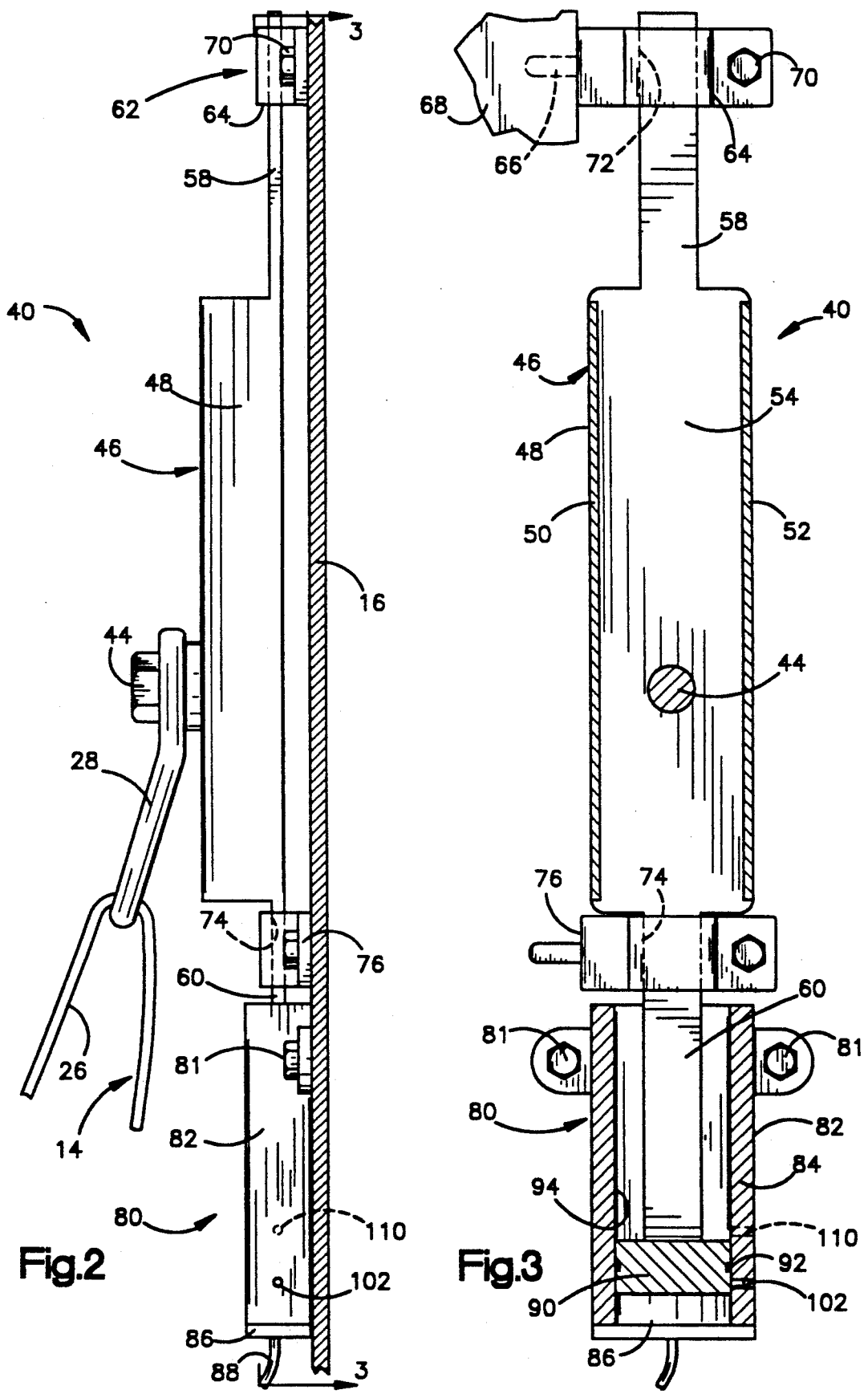

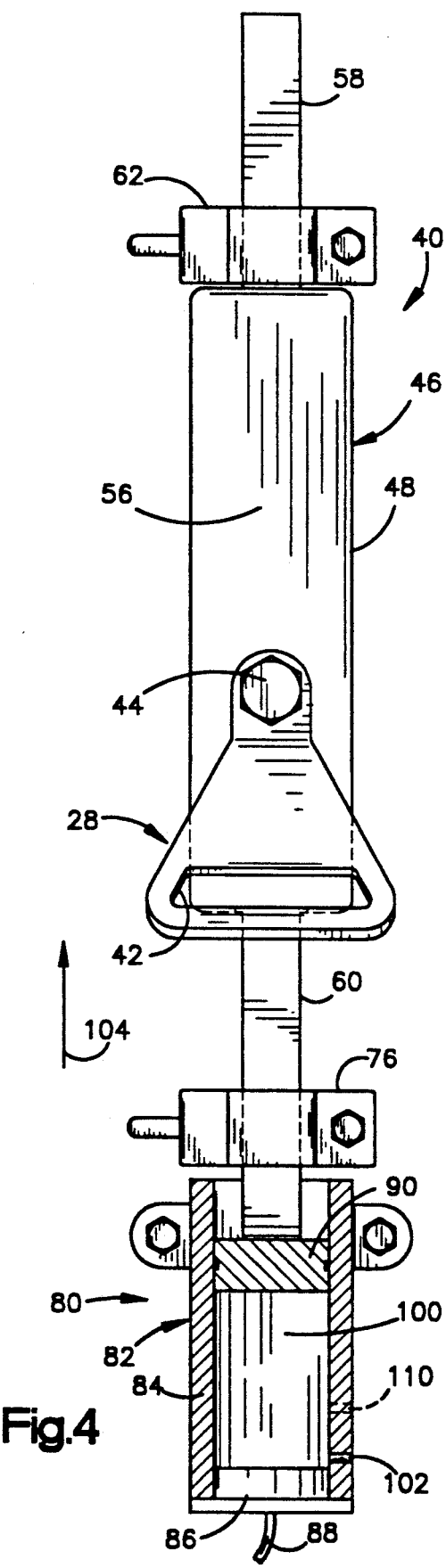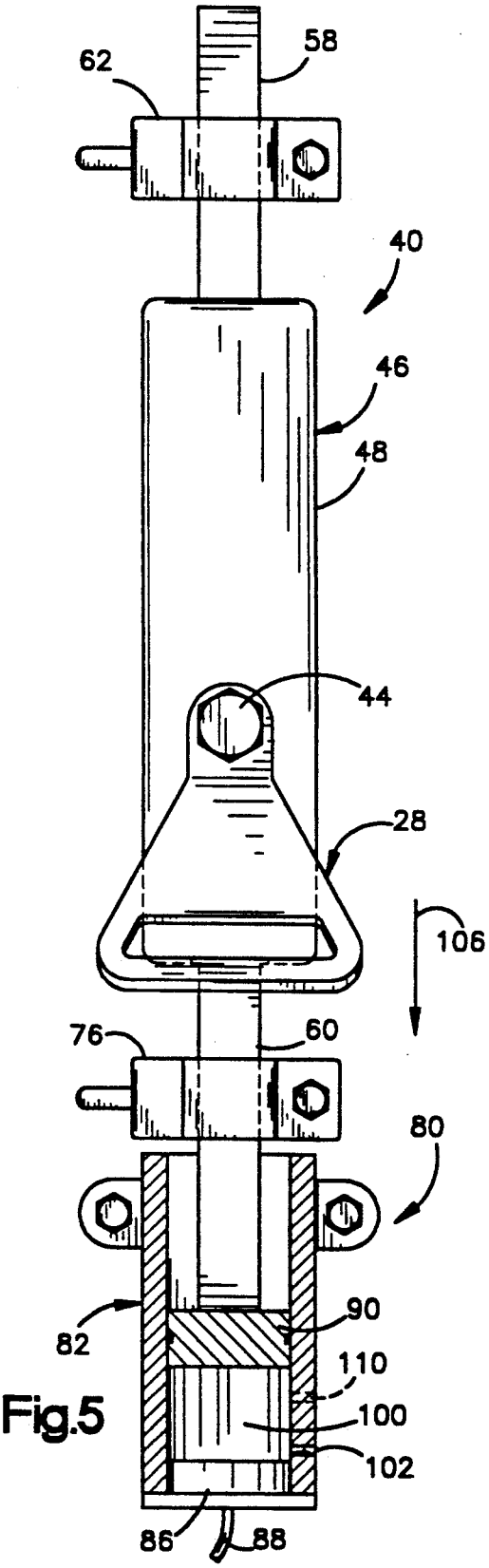

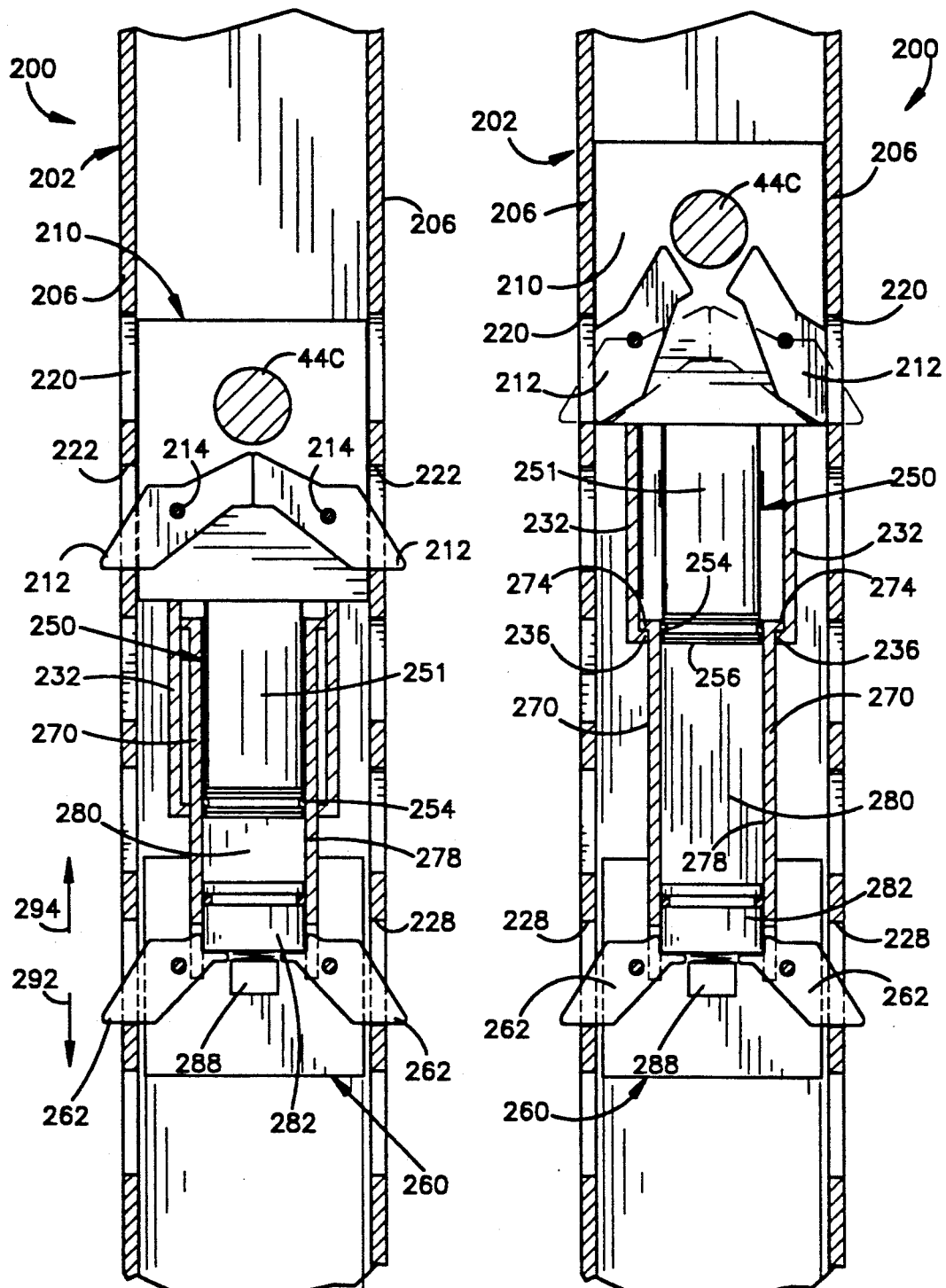

PRETENSIONING SAFETY BELT APPARATUS

BACKGROUND OF THE INVENTION

1. Technical Field

The present invention relates to an apparatus for guiding a length of seat belt webbing relative to the body of a vehicle, and particularly to a D-ring assembly which guides a length of shoulder belt webbing in a vehicle.

2. Description of the Prior Art

In a typical three-point vehicle safety belt system, belt webbing extends from a retractor mounted on the vehicle body upwards through an opening in a D-ring fixed to the vehicle body. A shoulder belt portion of the webbing extends across a vehicle occupant's torso between the D-ring and a buckle assembly disposed inboard of the vehicle occupant seat. Upon vehicle deceleration at a rate above a predetermined rate, such as occurs in a collision, the shoulder belt webbing restrains forward movement of the vehicle occupant relative to the vehicle.

To restrain forward movement of the vehicle occupant, it is preferable that there be no slack in the shoulder belt webbing as it extends around the torso of the vehicle occupant. Thus, forward movement of the vehicle occupant would immediately be restrained by the shoulder belt webbing in the event of sudden vehicle deceleration such as occurs in a collision. However, some safety belt systems provide a small amount of slack in the shoulder belt webbing to increase the comfort level of the vehicle occupant. These safety belt systems allow some forward movement of the vehicle occupant to occur upon sudden vehicle deceleration and before the shoulder belt webbing restrains forward movement of the occupant. This can increase the risk or level of injury to the vehicle occupant.

It is known from U.K. published Pat. application 2243533A to move a D-ring upward on a vehicle upon sudden deceleration, to remove slack from ("pretension") the shoulder belt webbing.

SUMMARY OF THE INVENTION

The present invention is an apparatus for guiding a length of seat belt webbing relative to the body of a vehicle. The webbing is extensible around the body of a vehicle occupant to restrain forward movement of the vehicle occupant relative to the vehicle. The apparatus includes a webbing guide for guiding the webbing around the body of the vehicle occupant. The webbing guide has surfaces defining a webbing opening through which the webbing can extend. The apparatus includes means responsive to vehicle deceleration at a rate above a predetermined rate for moving the webbing guide upward on the vehicle to remove slack from (pretension) webbing extending through the webbing guide.

In one embodiment of the invention, a D-ring assembly includes means responsive to vehicle deceleration to direct gas under pressure into an expansible chamber to move the webbing guide upward to remove slack from webbing extending through the webbing guide. Gas outlet means are provided for enabling controlled flow of gas out of the expansible chamber. Such a controlled flow of gas allows controlled downward movement of the webbing guide under tension resulting from forward movement of the vehicle occupant subsequent to upward movement of the webbing guide.

In another embodiment of the invention, a D-ring assembly includes means responsive to vehicle deceleration for moving the webbing guide upward. The means for moving the webbing guide upward is connected with the webbing guide for movement with the webbing guide.

In another embodiment of the invention, a D-ring assembly includes height adjustment means operable by the vehicle occupant for selectively positioning the webbing guide at one of a plurality of predetermined positions on the vehicle.

BRIEF DESCRIPTION OF THE DRAWINGS

The foregoing and other features of the invention will become apparent to one skilled in the art to which the invention pertains upon a consideration of the following description of the invention with reference to the accompanying drawings, wherein:

FIG. 2 is a partial side view of the D-ring assembly of FIG. 1;

FIG. 3 is a sectional view taken along line 3—3 of FIG. 2 and showing the D-ring in its lower position;

FIG. 4 is a front view, partially in section, of the D-ring assembly of FIG. 2 and showing the D-ring in its upper position;

FIG. 5 is a view similar to FIG. 4 and showing the D-ring moved partially downward from the position of FIG. 4;

FIG. 10 is a view similar to FIG. 9 and showing the D-ring assembly in a first stage of actuation;

FIG. 11 is a view similar to FIG. 10 and showing the D-ring in the upper position.

DESCRIPTION OF PREFERRED EMBODIMENTS OF THE INVENTION

Figure 1:
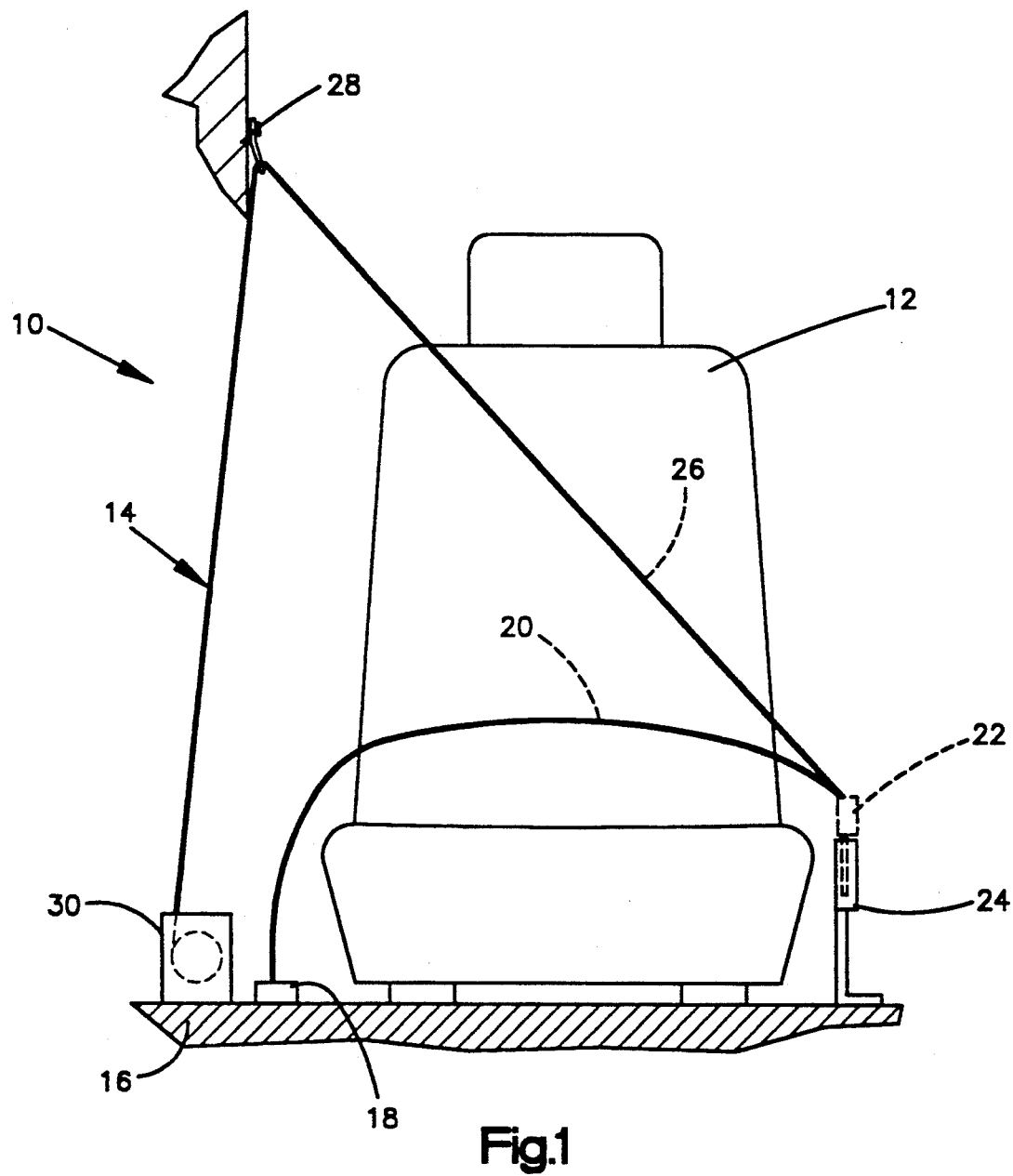
FIG. 1 is a schematic view of a vehicle seat and a safety apparatus for use in restraining movement of an occupant of the seat including a D-ring assembly in accordance with the present invention.

The present invention is illustrated in FIG. 1 as applied to a three-point vehicle safety belt system 10 for restraining forward movement of a vehicle occupant in the event of vehicle deceleration at a rate above a predetermined rate, such as occurs in a collision. It should be understood that the present invention could be applied to other safety belt systems. In the safety belt system 10 of FIG. 1, a vehicle occupant sits on a seat 12 which is illustrated as a front passenger seat in the vehicle. A length of belt webbing 14 is extensible about the vehicle occupant. One end of the length of belt webbing 14 is anchored to the vehicle body 16 at an anchor point 18. A lap belt section 20 of the belt webbing 14 extends across the seat 12 to a tongue assembly 22 received in a buckle 24 secured to the vehicle body 16. A shoulder belt section 26 of the belt webbing 14 extends from the tongue assembly 22 upwardly across the seat back to a D-ring 28. The webbing 14 passes through the D-ring 28 and extends vertically downward to an emergency locking retractor 30.

A pretensioning D-ring assembly 40 in accordance with the present invention is illustrated in FIGS. 2-5. The D-ring 28 has a webbing opening 42 (FIG. 4) through which the belt webbing 14 is extensible. The D-ring 28 is secured by a bolt 44 to a D-ring bracket 46. The D-ring bracket 46 has a rectangular tube shaped body portion 48 with opposed side walls 50 and 52 (FIG. 3), a back wall 54, and a front wall 56 (FIG. 4). An upper end portion 58 of the D-ring bracket 46 extends upward from the body portion 48. A lower end portion 60 of the D-ring bracket 46 extends downward from the body portion 48.

The D-ring bracket upper end portion 58 is slidably received in an upper bracket mounting assembly 62. The upper bracket mounting assembly 62 includes a sleeve 64 having one end shaped as a finger 66-inserted below a vehicle body portion 68. The other end of the sleeve 64 is fixed by a bolt 70 to the vehicle body. The D-ring bracket upper end portion 58 is slidable up and down in a slot 72 in the sleeve 64. Similarly, the lower end portion 60 of the D-ring mounting bracket 46 is slidable up and down in a slot 74 in a lower bracket mounting assembly 76 similar to the mounting assembly 62 and fixed to the vehicle body 16.

A pyrotechnic charge assembly 80 is secured to the vehicle body 16 by a pair of bolts 81. The pyrotechnic charge assembly 80 includes a cylinder member 82 having a wall 84. A pyrotechnic charge 86 is fixed to the lower end of the cylinder member 82. A lead wire 88 extends from the pyrotechnic charge 86 to vehicle circuitry (not shown).

A piston 90 is fixed to the lower end portion 60 of the D-ring bracket 46 for movement with the D-ring bracket. The piston 90 is slidably received in the cylinder member 82 of the pyrotechnic assembly 80. A seal member 92 on the piston 90 seals against an inner wall surface 94 of the cylinder member wall 84.

The piston 90 and the pyrotechnic charge 86 define between them an axially expansible chamber 100 (FIGS. 4 and 5) within the cylinder member 82. As the piston 90 moves in the cylinder member 82, the length of the expansible chamber 100 varies accordingly. The pyrotechnic charge 86 seals the lower axial end of the chamber 100. The piston 90 and its seal member 92 seal the upper axial end of the chamber 100. A gas outlet opening 102 extends transversely through the wall 84 of the cylinder member 82 and vents the chamber 100.

In the event of vehicle deceleration at a rate above a predetermined rate, such as occurs in a collision, the pyrotechnic charge 86 is ignited by an electrical signal through the lead wire 88. When the pyrotechnic charge 86 is ignited, it rapidly produces gas under pressure. The gas flows upwardly from the pyrotechnic charge 86. The gas impinges upon the piston 90, which is initially in its lower position as shown in FIG. 3.

The piston 90 moves up in the chamber 100 under the influence of the rising gas pressure, in the direction indicated by the arrow 104 (FIG. 4). The D-ring bracket 46 and the D-ring 28, which are connected for movement with the piston 90, also move up. The upper end portion 58 of the D-ring bracket 46 slides through the upper bracket mounting assembly 62, and the lower end portion 60 of the D-ring bracket slides through the lower bracket mounting assembly 76. When the D-ring bracket 46 and the D-ring 28 reach their upper position as shown in FIG. 4, engagement of the D-ring bracket with the upper bracket mounting assembly 62 limits upward movement of the D-ring bracket and of the D-ring.

When the D-ring 28 moves upward, the distance between the retractor 30 (FIG. 1) and the D-ring increases, and the distance between the tongue assembly 22 and the D-ring also increases. Belt webbing can not be withdrawn from the retractor 30 which has locked up in response to the vehicle deceleration. Therefore, slack in the shoulder belt portion 26 of the belt webbing 14 is removed as the D-ring 28 moves up, and the belt webbing is tightened about the torso of the vehicle occupant.

The D-ring 28 reaches its upper position, as shown in FIG. 4, before the vehicle occupant begins to move forward in the vehicle. When the vehicle occupant then begins to move forward in the vehicle, relative to the D-ring 28, the force of the vehicle occupant's forward movement is transmitted into the shoulder belt portion 26 of the belt webbing 14. The forces on the webbing portion 26 place a downward directed force component on the D-ring 28 as indicated by the arrow 106 in FIG. 5. This loads the belt webbing portion 26 and the D-ring 28 in a direction opposite to the upward force on the D-ring resulting from the pressure of the gas in the chamber 100.

The downward force on the D-ring 28 resulting from the forward movement of the vehicle occupant typically is large enough to exceed the upward force on the D-ring resulting from the pressure of the gas in the chamber 100. When this happens, the D-ring 28 and the D-ring bracket 46 begin to move down as shown in FIG. 5. The piston 90, which is connected for movement with the D-ring 28, also moves down. As the piston 90 moves down, the gas in the chamber 100 flows out of the chamber 100 through the gas outlet 102. The gas flow area of the gas outlet 102 is selected to restrict gas flow out of the chamber 100 to a level sufficient to provide a cushioning or shock absorbing effect as the D-ring 28 moves down under loading from the vehicle occupant. Thus, as the D-ring 28 moves down, the length of the shoulder portion 26 of the belt webbing 14 increases, allowing the vehicle occupant to move forward in the vehicle by a limited amount and at a controlled rate. Thus, some of the energy of the vehicle occupant's forward movement arising from the sudden vehicle deceleration is absorbed or dissipated in flow of gas through the gas outlet 102.

During the time period before the D-ring 28 is fully loaded by forward movement of the vehicle occupant, the pyrotechnic charge 86 produces gas at a rate equivalent to or greater than the rate of gas flow through the gas outlet 2. Therefore, after the D-ring 28 reaches its upper position as shown in FIG. 4 and the chamber 100 can no longer increase in volume, the gas pressure in the chamber is maintained even though some of the gas in the chamber 100 flows out of the chamber through the gas outlet 102 prior to downward movement of the D-ring 28. The gas pressure in the chamber 100 is maintained at a level high enough to restrict the rate of downward movement of the D-ring 28 when the D-ring begins moving down.

It should be noted that a gas outlet from the chamber 100 may be provided at a different location. For example, the gas outlet 102 may be replaced by a gas outlet 110 (shown in dashed lines in FIGS. 4 and 5) extending through the wall 84 of the cylinder member 82 at a location farther from the lower position of the piston 90. If this is the case, the piston 90 does not move completely back to its lower position as illustrated in FIG. 3 as a result of downward movement of the D-ring 28. Rather, some gas remains in the chamber 100 to provide a partial return stroke of the piston 90 in the chamber and a "bottoming spring" effect.

Figure 6:
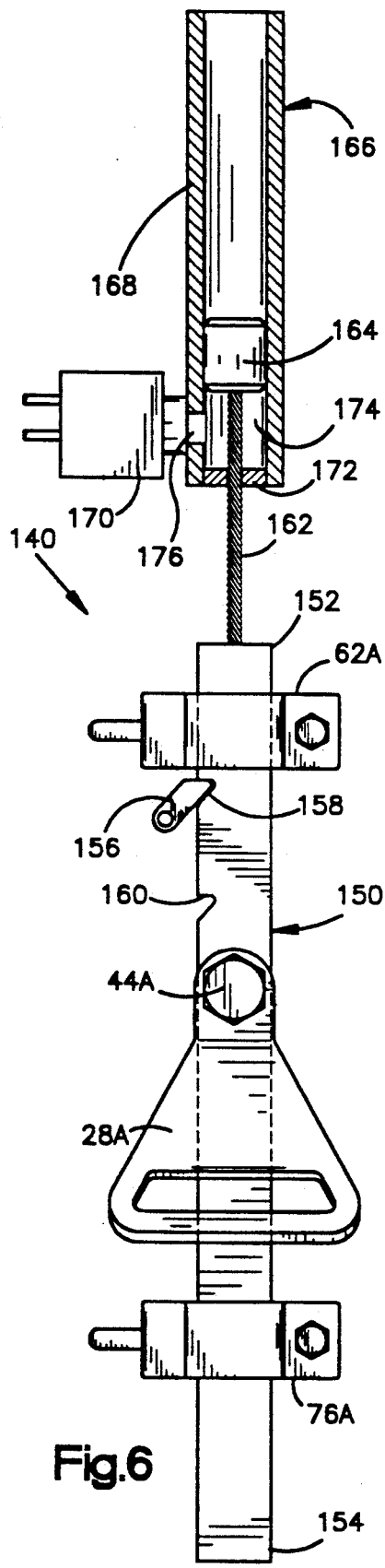
FIG. 6 is a schematic view illustrating a D-ring assembly in accordance with a second embodiment of the invention.

A pretensioning D-ring assembly 140 in accordance with a second embodiment of the invention is illustrated schematically in FIG. 6. In the second embodiment of the invention, a bolt 44A secures a D-ring 28A to a D-ring bracket 150. A shoulder belt portion of seat belt webbing (not shown) extends through the D-ring 28A. The D-ring bracket 150 has an upper end portion 152 slidably received in an upper bracket mounting assembly 62A fixed to the vehicle body (not shown). The D-ring bracket 150 has a lower end portion 154 slidably received in a lower bracket mounting assembly 76A also fixed to the vehicle body. A lock pawl 156 pivotally mounted on the vehicle body is biased by a spring (not shown) into engagement in an upper lock pawl opening 158 in the D-ring bracket 150. A lower lock pawl opening 160 in the D-ring bracket 150 is spaced from the upper lock pawl opening 158.

A cable 162 connects the upper end portion 152 of the D-ring bracket 150 with a piston 164. The piston 164 is slidably received in a cylinder 166 fixed to the vehicle body. The cylinder 166 has a wall 168 to which is secured a pyrotechnic charge 170. The cable 162 extends through an opening in a seal member 172 disposed at the lower end of the cylinder 166. The piston 164 and the seal member 172 define between them an axially expansible chamber 174. An opening 176 in the cylinder wall 168 places the pyrotechnic charge 170 in fluid communication with the expansible chamber 174.

In the event of vehicle deceleration at a rate above a predetermined rate, such as occurs in a collision, the pyrotechnic charge 170 is energized by an electrical signal from vehicle circuitry (not shown). When the pyrotechnic charge 170 is energized, it rapidly produces gas under pressure. The gas flows through the opening 176 in the cylinder wall 168 and into the expansible chamber 174. The gas impinges upon the piston 172 which is initially in a downward position in the cylinder 166 as shown in FIG. 6.

The high pressure gas flowing into the expansible chamber 174 causes the piston 164 to move up in the cylinder 166. The cable 162 transmits the force of the moving piston 164 to the D-ring bracket 150, and the D-ring bracket and the D-ring 28A also move up. The upper end portion 152 of the D-ring bracket 150 slides through the upper bracket mounting assembly 62A, and the lower end portion 154 of the D-ring bracket slides through the lower bracket mounting assembly 76A. When the D-ring bracket 150 moves up, the lock pawl 156 is cammed outward out of the upper lock pawl opening 158.

As the D-ring 28A moves up, slack is removed from the shoulder belt portion of the seat belt webbing (not shown) extending through the D-ring, and the belt webbing is tightened about the torso of the vehicle occupant. The D-ring 28A reaches its upper position before the vehicle occupant begins to move forward in the vehicle. When the D-ring 28A is in its upper position, the lock pawl 156 engages in the lower lock pawl opening 160. This engagement blocks downward movement of the D-ring bracket 150 and of the D-ring 28A in the vehicle. Because the D-ring 28A can not move down, the length of the shoulder belt portion of the seat belt webbing can not increase, and forward movement of the vehicle occupant is restrained.

Figure 7:
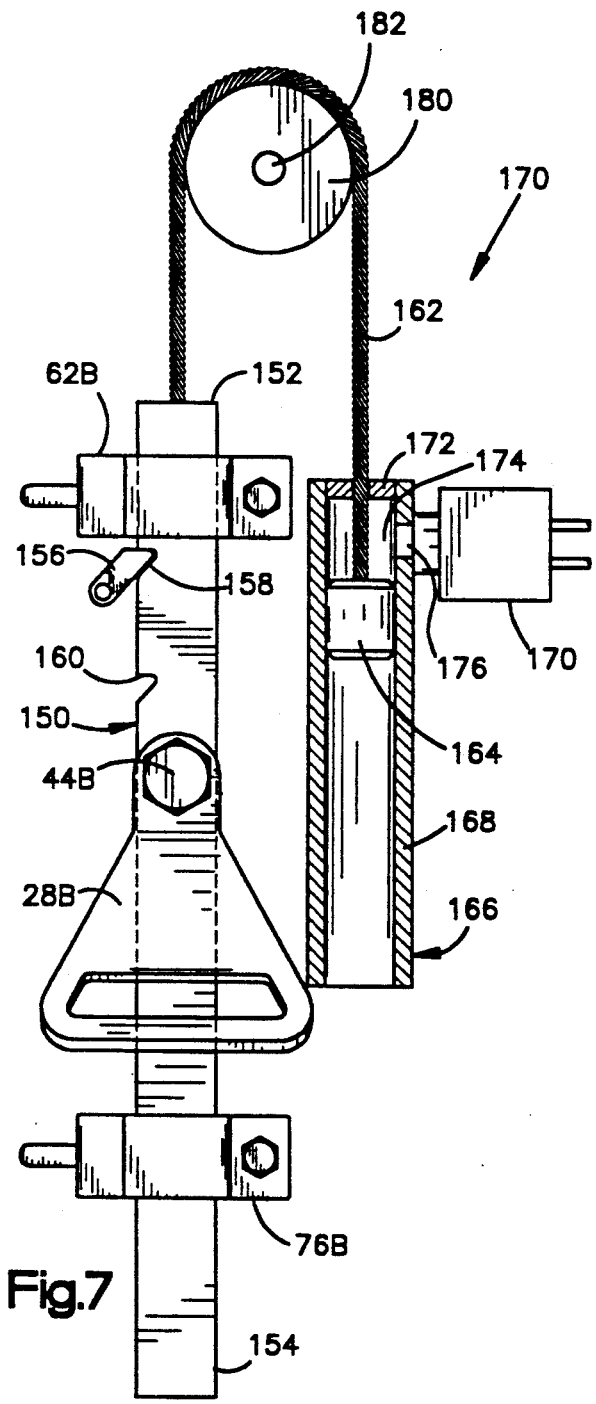
FIG. 7 is a schematic view similar to FIG. 6 illustrating a D-ring assembly in accordance with a third embodiment of the invention.
Figure 8:
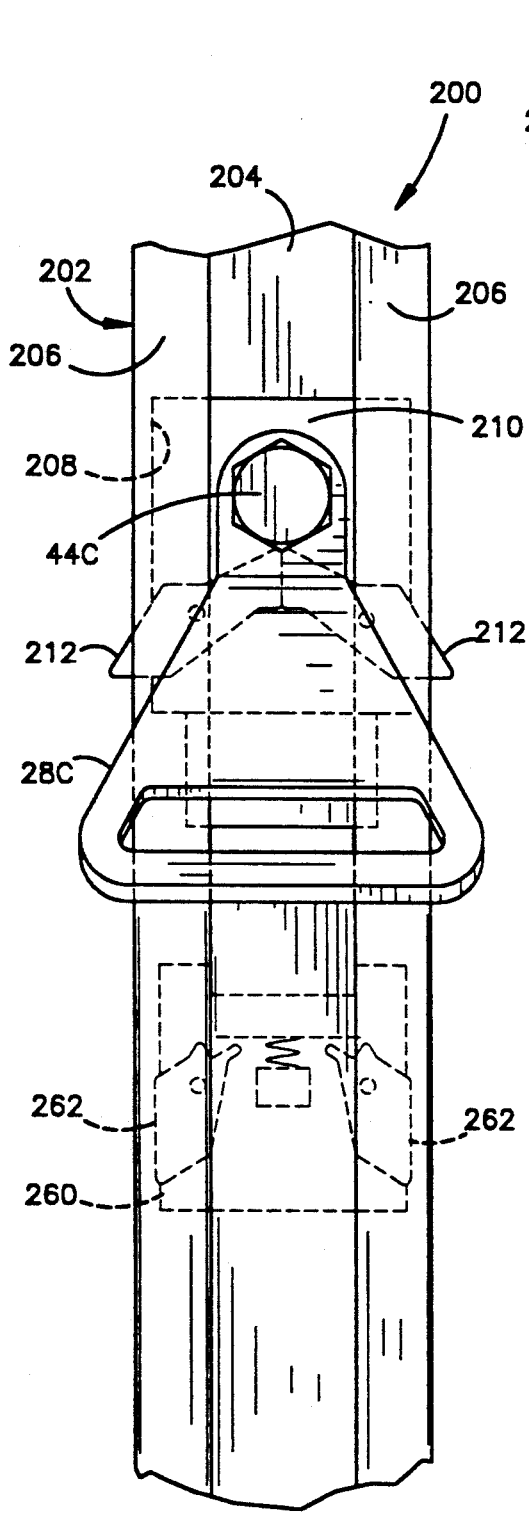
FIG. 8 is a schematic view illustrating a D-ring assembly in accordance with a fourth embodiment of the invention.

A pretensioning D-ring assembly 170 in accordance with a third embodiment of the invention, similar to the embodiment of FIG. 6, is illustrated schematically in FIG. 7. In this third embodiment, the cable 162 passes over a pulley 180 rotatable about a shaft 182 fixed to the vehicle. In the event of vehicle deceleration at a rate above a predetermined rate such as occurs in a collision, the pyrotechnic charge 170 is energized and produces gas under pressure. The gas flows into the expansible chamber 174 and causes the piston 164 to move down in the cylinder 166. The cable 162 extending over the pulley 180 transmits the force of the moving piston 164 to the D-ring bracket 150, and the D-ring bracket and the D-ring 28B move up in the vehicle. As the D-ring 28B moves up, slack in the shoulder belt portion of the seat belt system is removed, and the belt webbing is tightened about the torso of the vehicle occupant.

A pretensioning D-ring assembly 200 in accordance with a fourth embodiment of the invention is illustrated schematically in FIGS. 8-11. The D-ring assembly 200 includes a track 202 fixed to the vehicle body (not shown). The track 202 is C-shaped in cross section and has a back portion 204 mounted against the vehicle body and two upstanding flange portions 206. The flange portions 206 define between them a channel 208 in which a D-ring carrier 210 is slidable along the track 202. A D-ring 28C is fixed to the D-ring carrier 210 by a bolt 44C. The track 202 is oriented on the vehicle body so that movement of the D-ring carrier 210 along the track 202 moves the D-ring 28C up and down in the vehicle.

A pair of D-ring carrier lock pawls 212 are pivotally mounted on pins 214 fixed to the D-ring carrier 210. A series of opposed pairs of lock pawl openings 220, 222, 224, 226, and 228 extend through the flanges 206 of the track 202. When the D-ring carrier 210 is in the position shown in FIG. 9, the D-ring carrier lock pawls 212 are biased outwardly by springs (not shown) into engagement in the lock pawl openings 222. The D-ring carrier lock pawls 212 block downward movement of the D-ring carrier 210, and thus of the D-ring 28C, along the track 202 in the vehicle.

Figure 9:
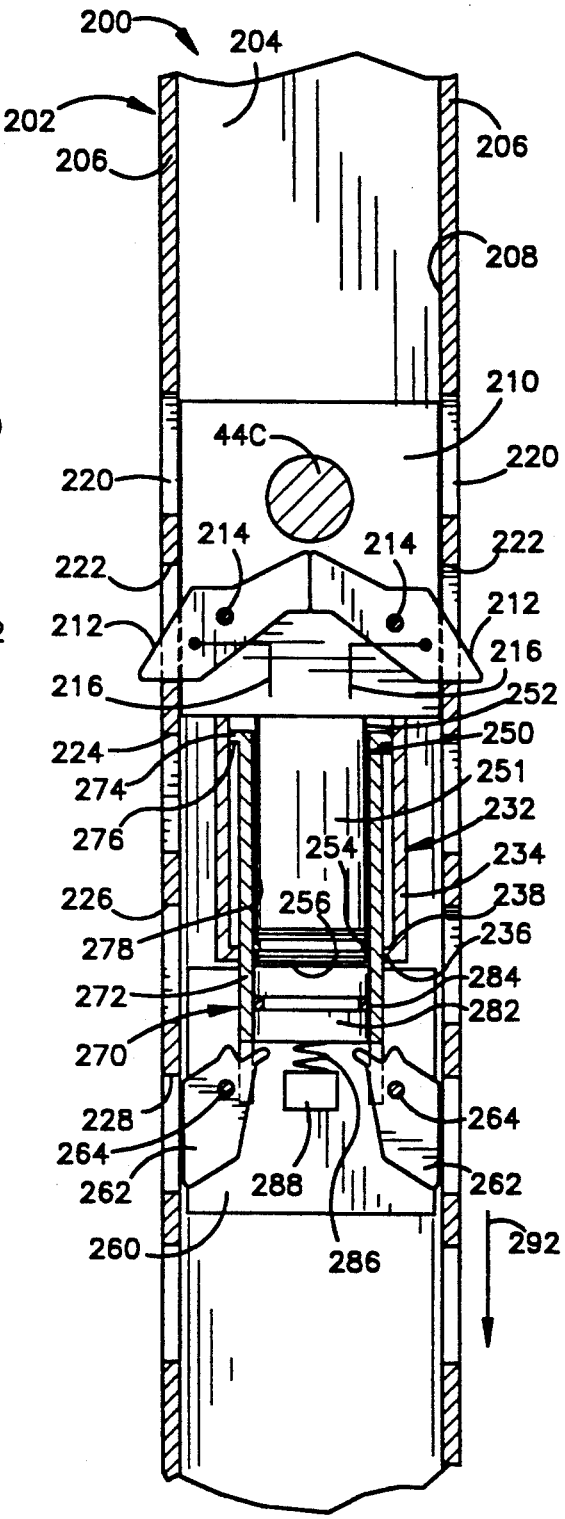
FIG. 9 is a front sectional view of the D-ring assembly of FIG. 8 showing the D-ring in its lower position.

A pair of finger grips 216 shown schematically in FIG. 9 are connected with the D-ring carrier lock pawls 212 and allow the vehicle occupant to pivot the lock pawls out of engagement with the lock pawl openings. To adjust the height of the D-ring 28C in the vehicle, the occupant moves the finger grips 216 inwardly to pivot the D-ring carrier lock pawls 212 out of the lock pawl openings 222. The vehicle occupant pushes the finger grips 216 up or down to set the vertical position of the D-ring 28C, then releases the finger grips 216. The D-ring carrier lock pawls 212 move outwardly into engagement in an adjacent pair of lock pawl openings in the track 202.

An outer cylinder member 232 is fixed to the D-ring carrier 210 for movement with the D-ring carrier. The outer cylinder member 232 projects downwardly from the D-ring carrier 210. The outer cylinder member 232 includes a vertically extending portion 234 and a horizontally inwardly extending end portion 236 on which an upwardly facing stop surface 238 is located.

A pyrotechnic charge 250 including a container 251 holding a quantity of ignitable material (not shown) is fixed to the D-ring carrier 210 for movement with the D-ring carrier. The pyrotechnic charge 250 is disposed inside the outer cylinder member 232. The container 251 has an outer side surface 252. A seal member 254 is disposed on a lower portion of the container 251. The pyrotechnic charge 250 has an end portion 256 facing away from the D-ring carrier 210.

A slave carrier 260 is slidable in the channel 208 in the track 202, in a direction parallel to the direction of movement of the D-ring carrier 210. A pair of slave carrier lock pawls 262 are pivotally mounted on pins 264 fixed to the slave carrier 260. The slave carrier lock pawls 262 are biased inwardly away from the flange portions 206 of the track 202 by springs (not shown). The slave carrier lock pawls 262 are pivotable outwardly into lock pawls openings in the track 202, such as the lock pawl openings 228 (FIG. 9), to block downward movement of the slave carrier 260 on the track 202.

An inner cylinder member 270 is fixed to the slave carrier 260 for movement with the slave carrier. The inner cylinder member 270 projects upwardly from the slave carrier 260 toward the D-ring carrier 210. The inner cylinder member 270 includes a vertically extending portion 272 and a horizontally outwardly extending end portion 274 on which a stop surface 276 is located. The inner cylinder member 270 is disposed inwardly of the outer cylinder member 232. The stop surface 276 on the inner cylinder member 270 faces downward toward the stop surface 238 on the outer cylinder member 232.

The inner cylinder member 270 is disposed outwardly of the pyrotechnic charge 250. There is a friction fit between the outer side surface 252 of the pyrotechnic charge container 251 and the inner side surface 278 of the inner cylinder member 270. The frictional engagement between the container 251 and the inner cylinder member 270 is sufficient to support the weight of the slave carrier 260 and its associated parts. Accordingly, as the vehicle occupant adjusts the position of the D-ring carrier 210 and the D-ring 28C up and down along the track 202, the slave carrier 260 moves with the D-ring carrier 210.

The vertical spacing between the D-ring carrier lock pawls 212 and the slave carrier lock pawls 262 is selected so that both sets of lock pawls are opposite pairs of lock pawl openings in the track 202 at the same time. For example, when the D-ring assembly 200 is in the position illustrated in FIG. 9, the D-ring carrier lock pawls 212 are engaged in the lock pawl openings 222 in the track 202, while the slave carrier lock pawls 262 are located adjacent to and inward of the lock pawl openings 228 in the track. During height adjustment of the D-ring 28C by the vehicle occupant, the relative positions of the D-ring carrier 210 and the slave carrier 260 remain the same.

The inner cylinder member 270 defines the sides of an axially extending expansible chamber 280 (FIGS. 10 and 11). The pyrotechnic charge 250 defines the upper end of the expansible chamber 280. The seal member 254 on the container 251 seals the upper axial end of the expansible chamber 280. A piston 282 defines the lower end of the expansible chamber 280. A seal member 284 on the piston 282 seals the lower end of the expansible chamber 280. The piston 282 is supported on a compression spring 286 extending upwardly from a piston stop 288 fixed to the slave carrier 260. The spring 286 biases the piston 202 upwardly toward the end surface 256 of the pyrotechnic charge 250 as seen in FIG. 9.

In the event of vehicle deceleration at a rate above a predetermined rate, such as occurs in a collision, the pyrotechnic charge 250 is ignited by an electrical signal in a known manner. When the pyrotechnic charge 250 is ignited, it rapidly produces gas under pressure which flows out of the end portion 256 of the pyrotechnic charge.

The high pressure of the gas flowing into the expansible chamber 280 (FIG. 10) tends to try to increase the volume of the expansible chamber 280 by axially separating the piston 282 and the pyrotechnic charge 250. Because there is only a frictional engagement between the pyrotechnic charge container 251 and the inner cylinder member 270, the D-ring carrier 210 can move up relative to the slave carrier 260 to increase the volume of the expansible chamber 280. However, the biasing effect of the compression spring 286 is selected to be less than the amount of force required to overcome the frictional engagement between the pyrotechnic charge container 251 and the inner cylinder member 270. Thus, as the pressure in the expansible chamber 280 increases, the piston 282 initially moves down in the expansible chamber, in the direction indicated by the arrow 292 (FIG. 10).

As the piston 282 moves down, it cams the slave carrier lock pawls 262 outward into the lock pawl openings 228 in the track 202. The pyrotechnic charge 250 continues to produce high pressure gas. The pressure in the expansible chamber 280 is transmitted through the piston 282 and the piston stop 288 into downward movement of the slave carrier 260. However, only a very small amount of downward movement of the slave carrier 260 is possible, until the slave carrier lock pawls 262 engage fully in the lock pawl openings 228. This engagement blocks further downward movement of the slave carrier lock pawls 262, and thus of the slave carrier 260 and the piston 282, relative to the track 202.

The pyrotechnic charge 250 continues to produce high pressure gas. Since the piston 282 can no longer move down, the pressure in the expansible chamber 280 continues to increase, acting upward on the end portion 256 of the pyrotechnic charge 250, until it overcomes the frictional engagement between the container and the inner cylinder member 270. The pyrotechnic charge 250 then moves up relative to the slave carrier 260, taking with it the D-ring carrier 210, in the direction indicated by the arrow 94 (FIG. 10), from the position shown in FIG. 10 toward the position shown in FIG. 11. As the D-ring carrier 210 moves up, the D-ring carrier lock pawls 212 are cammed inward out of engagement with the lock pawl openings 222 in the track 202.

As the D-ring carrier 210 moves up, the end portions 36 of the outer cylinder member 232 slide upward along the vertically extending portion 272 of the inner cylinder member 270, and the end portions 274 of the inner cylinder member slide along the vertically extending portion 234 of the outer cylinder member. The outer side surface 252 of the pyrotechnic charge container 251 slides along the vertically extending portion 272 of the inner cylinder member 270. The D-ring carrier 210 and the pyrotechnic charge 250 move up relative to the slave carrier 260 until the stop surface 238 on the outer cylinder member 232 engages the stop surface 276 on the inner cylinder member 270. This engagement of the respective stop surfaces 238 and 276 blocks further upward movement of the D-ring carrier 210.

The D-ring 28C moves up as the D-ring carrier moves up. As the D-ring 28C moves to its uppermost position as shown in FIG. 11, the shoulder belt portion 26 of the belt webbing 14 extending through the D-ring 28C is tightened about the torso of the vehicle occupant. The D-ring 28C is moved up rapidly enough so that the D-ring reaches its upper position, as shown in FIG. 11, before the vehicle occupant begins to move forward in the vehicle.

When the D-ring 28C reaches its upper position, the D-ring carrier lock pawls 212 are adjacent to and inward from the lock pawl openings 220 in the track 202. The D-ring carrier lock pawls 212 spring outward into the lock pawl openings 220. The D-ring carrier lock pawls 212 block downward movement of the D-ring carrier 210 and of the D-ring 28C relative to the track 202. Because the D-ring 28C can not move down relative to the track 202, the length of the shoulder belt portion 26 of the belt webbing 14 can not increase, and forward movement of the vehicle occupant is restrained.

It should be understood that one or more gas outlets, such as the gas outlet 102 in the embodiment of the invention shown in FIGS. 2–5, can be included in the embodiment of the invention shown in FIGS. 8–11. These gas outlets could extend laterally through the inner cylinder member 270 to allow gas flow out of the expansible chamber 280, for example. If such gas outlets are provided, then the position and spacing of the lock pawl openings in the track 202 would be set so that the D-ring carrier lock pawls 212 do not engage in any of the lock pawl openings when the D-ring carrier 210 is in its upper position. The D-ring carrier 210 would move downward as a result of forward movement of the vehicle occupant against the tightened shoulder belt webbing portion 26, and the gas outlets would provide an energy absorbing function to cushion downward movement of the D-ring 28C.

The orifice 102 (FIGS. 2–5) is a fixed orifice. If desired, the fixed orifice 102 may be replaced with a variable orifice which changes in fluid flow area in response to changes in the pressure within the chamber 100.

Figure 12:
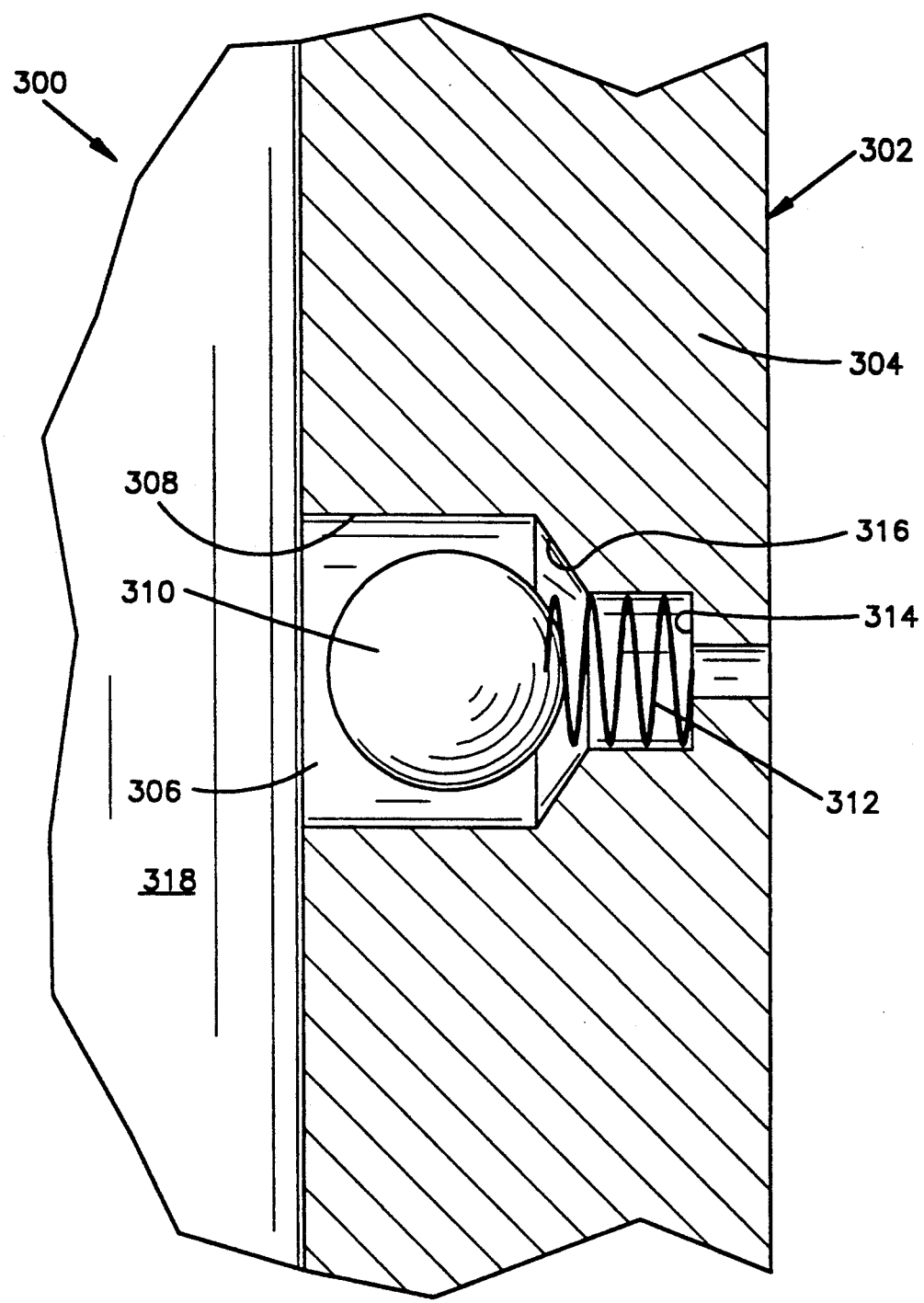
FIG. 12 illustrates schematically a variable orifice for use in a D-ring assembly in accordance with the present invention.

An example is illustrated schematically in FIG. 12 which shows a portion of a pyrotechnic pretensioning D-ring assembly 300 having a cylinder 302 with a cylinder wall 304. The cylinder wall 304 has an opening 306 defined by a wall 308. A ball 310 is received in the opening 306. The ball 310 is biased toward the inside of the cylinder 302 (to the left as viewed in FIG. 12) by a compression spring 312 extending between the ball and a shoulder 314. Suitable means (not shown) may be provided on the cylinder wall 304 to block movement of the ball 310 out of the opening 306 in a direction to the left as viewed in FIG. 12. A tapered wall portion 316 limits movement of the ball 310 within the opening 306 in a direction to the right as viewed in FIG. 12.

Upon actuation of a pyrotechnic device (not shown) connected with the pyrotechnic pretensioning D-ring assembly 300, fluid pressure increases in the chamber 318 within the cylinder 302. As the fluid pressure in the chamber 318 increases, the ball 310 moves to the right as viewed in FIG. 12 against the biasing effect of the spring 312. As the ball 310 thus moves, the fluid flow area between the wall 308 and the ball decreases. Movement of the ball 310 in a direction to the right as viewed in FIG. 12 is limited by the tapered wall portion 316 to ensure some fluid flow through the opening 306 even when the pressure in the chamber 318 is at its highest. This variable orifice feature can be employed in any embodiment of the present invention as desired to control fluid flow out of an expansible chamber.

It is contemplated that devices other than a pyrotechnic charge can be used to move the D-ring upward in any embodiment of the present invention. For example, a container of stored gas, or another device which directs fluid or a fluidic material into an expansible chamber could replace the pyrotechnic charge. It should also be understood that any embodiment of the present invention might or might not be height adjustable and might or might not have energy absorbing means as described.

From the above description of the invention, those skilled in the art will perceive improvements, changes and modifications in the invention. Such improvements, changes and modifications within the skill of the art are intended to be covered by the appended claims.

I claim:

1. An apparatus comprising:
   a webbing guide for guiding a length of seat belt webbing relative to the body of a vehicle, said webbing guide having surfaces defining a webbing opening through which the webbing can extend;
   a part connected with said webbing guide and movable with said webbing guide, said part having a surface at least partially defining an expansible chamber for receiving fluid;
   means responsive to vehicle deceleration at a rate above a predetermined rate for directing fluid under pressure into the expansible chamber to move said webbing guide upward to tension webbing extending through the webbing opening in said webbing guide; and
   energy absorbing means for absorbing energy of downward movement of said webbing guide subsequent to upward movement of said webbing guide, comprising fluid outlet means for enabling controlled flow of fluid out of the expansible chamber during downward movement of said webbing guide.

2. An apparatus as set forth in claim 1 including at least one wall partially defining the expansible chamber and wherein said fluid outlet means comprises a first fluid outlet opening extending through said wall.

3. An apparatus as set forth in claim 1 wherein said means for directing fluid under pressure into the expansible chamber comprises a pyrotechnic charge.

4. An apparatus as set forth in claim 1 wherein said means for directing fluid into the expansible chamber directs fluid into the expansible chamber at a rate at least equal to the rate of fluid flow through said fluid outlet means.

5. An apparatus as set forth in claim 1 including height adjustment means connected with said webbing guide and operable by an occupant of the vehicle for selectively positioning said webbing guide at one of a plurality of predetermined positions on the vehicle.

6. An apparatus as set forth in claim 1 wherein said means for directing fluid under pressure is movable with said webbing guide.

7. An apparatus as set forth in claim 1 wherein said fluid outlet means comprises surface means for defining a passage placing the expansible chamber in fluid communication with atmosphere, the passage having a cross-sectional area selected to restrain fluid flow from the expansible chamber to limit the rate of downward movement of said webbing guide.

8. An apparatus as set forth in claim 1 wherein said fluid outlet means comprises a fluid orifice which changes in fluid flow area in response to changes in pressure within the expansible chamber.

9. An apparatus for guiding a length of seat belt webbing relative to the body of a vehicle, the seat belt webbing being extensible around the body of a vehicle occupant to restrain forward movement of the vehicle occupant relative to the vehicle, said apparatus comprising:
   a webbing guide for guiding the seat belt webbing around the body of the vehicle occupant, said webbing guide having surfaces defining a webbing opening through which the webbing can extend;
   support means for supporting said webbing guide for manual adjustment of the height of said webbing guide on the vehicle;
   manually engageable means for moving said webbing guide relative to said support means in response to manual force applied to said manually engageable member to adjust manually the height of said webbing guide on the vehicle;
   means for locking said webbing guide in any one of a number of manually adjusted positions along said support member; and
   means responsive to vehicle deceleration at a rate above a predetermined rate for moving said webbing guide upward on the vehicle to tension seat belt webbing extending through the webbing opening in said webbing guide.

10. An apparatus as set forth in claim 9 wherein said means for moving said webbing guide upward on the vehicle includes means for producing fluid under pressure to move said webbing guide upward from a selected one of said number of manually adjusted positions to tension belt webbing extending through said webbing guide.

11. An apparatus as set forth in claim 10 including means for absorbing energy of downward movement of said webbing guide toward a selected one of the number of manually adjusted positions subsequent to upward movement of said webbing guide from said selected one of the number of manually adjusted positions to tension belt webbing extending through said webbing guide.

12. An apparatus for guiding a length of seat belt webbing relative to the body of a vehicle occupant, the seal belt webbing being extensible around the body of the vehicle occupant to restraining forward movement of the vehicle occupant relative to the vehicle, said apparatus comprising:
   a member for connection in a force-transmitting relationship with the seat belt webbing and for locating the seat belt webbing relative to the body of the vehicle occupant when the seat belt webbing is extended around the body of the vehicle occupant;
   a part connected with said member and movable with said member, said part having a surface at least partially defining an expansible chamber for receiving fluid;
   means responsive to vehicle deceleration at a rate above a predetermined rate for directing fluid under pressure into the expansible chamber to move said member in a first direction to tension seat belt webbing connected in a force-transmitting relationship with said member; and
   energy absorbing means for absorbing energy of movement of said webbing guide in a second direction opposite to the first direction subsequent to movement of said member in the first direction, comprising fluid outlet means for enabling controlled flow of fluid out of the expansible chamber during movement of said in the second direction.

13. An apparatus for guiding a length of seat belt webbing relative to the body of a vehicle, the seat belt webbing being extensible around the body of a vehicle occupant to restrain forward movement of the vehicle occupant relative to the vehicle, said apparatus comprising:
   a webbing guide for guiding the seat belt webbing around the body of the vehicle occupant, said webbing guide having surfaces defining a webbing opening through which the webbing can extend;
   height adjustment means operable by the vehicle occupant for selectively positioning said webbing guide at one of a plurality of predetermined positions on the vehicle;
   means responsive to vehicle deceleration at a rate above a predetermined rate for moving said webbing guide upward on the vehicle to tension seat belt webbing extending through the webbing opening in said webbing guide;
   said means for moving said webbing guide upward on the vehicle including means for producing fluid under pressure to move said webbing guide upward from a selected one of said plurality of predetermined positions to tension belt webbing extending through said webbing guide; and
   means for absorbing energy of downward movement of said webbing guide toward a selected one of said plurality of predetermined positions subsequent to upward movement of said webbing guide from said selected one of said plurality of predetermined positions to tension belt webbing extending through said webbing guide, said means for absorbing energy comprising a fluid outlet for enabling flow of fluid out of the expansible chamber during downward movement of said webbing guide.

14. An apparatus as set forth in claim 13 wherein said fluid outlet changes in fluid flow area in response to changes in pressure within the expansible chamber.

15. An apparatus for guiding a length of seat belt webbing relative to the body of a vehicle, the seat belt webbing being extensible around the body f a vehicle occupant to restrain forward movement of the vehicle occupant relative to the vehicle, said apparatus comprising:
   a webbing guide for guiding the seat belt webbing around the body of the vehicle occupant, said webbing guide having surfaces defining a webbing opening through which the webbing can extend;
   height adjustment means operable by the vehicle occupant for selectively positioning said webbing guide at one of a plurality of predetermined positions on the vehicle; and
   means responsive to vehicle deceleration at a rate above a predetermined rate for moving said webbing guide upward on the vehicle to tension seat belt webbing extending through the webbing opening in said webbing guide;
   wherein said means for moving said webbing guide upward on the vehicle includes means for producing fluid under pressure to move said webbing guide upward from a selected one of said plurality of predetermined positions to tension belt webbing extending through said webbing guide, and a part connected with said webbing guide and movable with said webbing guide during height adjustment of said webbing guide, said part having a surface at least partially defining an expansible chamber for receiving the fluid under pressure, said means responsive to vehicle deceleration directing fluid under pressure into the expansible chamber to move said part and said webbing guide upward.

16. An apparatus as set forth in claim 15 wherein said height adjustment means includes track means on the vehicle body for guiding upward and downward movement of said webbing guide on the vehicle body, said means for producing fluid under pressure being movable with said webbing guide on said track means during height adjustment of said webbing guide.

17. An apparatus for guiding a length of seal belt webbing relative to the body of a vehicle, the seal belt webbing being extensible around the body of a vehicle occupant to restrain forward movement of the vehicle occupant relative to the vehicle, said apparatus comprising:
a webbing guide for guiding the seat belt webbing around the body of the vehicle occupant, said webbing guide having surfaces defining a webbing opening through which the webbing can extend;
height adjustment means operable by the vehicle occupant for selectively positioning said webbing guide at one of a plurality of predetermined positions on the vehicle; and
means responsive to vehicle deceleration at rate above a predetermined rate for moving said webbing guide upward on the vehicle to tension seat belt webbing extending through the webbing opening in said webbing guide, including means for blocking downward movement of said webbing guide on the vehicle from a selected one of said plurality of predetermined positions prior to moving said webbing guide upward on the vehicle.

18. An apparatus for guiding a length of seat belt webbing relative to the body of a vehicle, the seat belt webbing being extensible around the body of a vehicle occupant to restrain forward movement of the vehicle occupant relative to the vehicle, said apparatus comprising:
a webbing guide for guiding the seat belt webbing around the body of the vehicle occupant, said webbing guide having surfaces defining a webbing opening through which the webbing can extend;
guide means on the vehicle body for guiding movement of said webbing guide relative to the vehicle body, said webbing guide being movable upward along said means for guiding;
means responsive to vehicle deceleration at a rate above a predetermined rate for moving said webbing guide upward to tension seat belt webbing extending through the webbing opening in said webbing guide, said means for moving said webbing guide upward being connected with said webbing guide for movement with said webbing guide; and
first and second carriers selectively movable together on the vehicle, said webbing guide being connected for movement with said first carrier, said apparatus including blocking means connected for movement with said second carrier for blocking downward movement of said first and second carriers.

19. An apparatus as set forth in claim 18 including a first part fixed for movement with said first carrier and a second part fixed for movement with said second carrier, said first and second parts having respective frictionally engaging surfaces releasably connecting said first carrier for movement with said second carrier, the frictional engagement between said first and second parts being overcome upon upward movement of said webbing guide in responsive to vehicle deceleration at a rate above a predetermined rate.

20. An apparatus for guiding a length of seat belt webbing relative to the body of a vehicle, the seat belt webbing being extensible around the body of a vehicle occupant to restrain forward movement of the vehicle occupant relative to the vehicle, said apparatus comprising:
a webbing guide for guiding the seat belt webbing around the body of the vehicle occupant, said webbing guide having surfaces defining a webbing opening through which the webbing can extend;
guide means on the vehicle body for guiding movement of said webbing guide relative to the vehicle body, said webbing guide being movable upward along said means for guiding; and
means responsive to vehicle deceleration at a rate above a predetermined rate for moving said webbing guide upward to tension seat belt webbing extending through the webbing opening in said webbing guide, said means for moving said webbing guide upward being connected with said webbing guide for movement with said webbing guide;
wherein said means for moving said webbing guide includes:
a first carrier member, said webbing guide and said means for moving said webbing guide upward being connected for movement with said first carrier member;
a second carrier member having blocking means connected for movement with said second carrier member for blocking downward movement of said first and second carrier members; and
connector parts connecting said first carrier member for movement with said second carrier member;
said first and second carrier members having respective surfaces defining between them an expansible chamber for receiving fluid under pressure to move said webbing guide upward on the vehicle.

21. An apparatus as set forth in claim 20 wherein said means for moving said webbing guide upward comprises means for actuating said blocking means to thereby block downward movement of said first and second carrier members prior to moving said webbing guide upward on the vehicle.

22. An apparatus as set forth in claim 20 wherein said means for moving said webbing guide upward includes a pyrotechnic charge fixed for movement with said first carrier member.

23. An apparatus for guiding a length of seat belt webbing relative to the body of a vehicle, the seat belt webbing being extensible around the body of a vehicle occupant to restrain forward movement of the vehicle occupant relative to the vehicle, said apparatus comprising:
a webbing guide for guiding the seat belt webbing around the body of the vehicle occupant, said webbing guide having surfaces defining a webbing opening through which the webbing can extend;

guide means on the vehicle body for guiding movement of said webbing guide relative to the vehicle body, said webbing guide being movable upward along said means for guiding;

means responsive to vehicle deceleration at a rate above a predetermined rate for moving said webbing guide upward to tension seat belt webbing extending through the webbing opening in said webbing guide, said means for moving said webbing guide upward comprising a source of motive power connected with said webbing guide for movement with said webbing guide and means for actuating said source of motive power in responsive to vehicle deceleration at a rate above a predetermined rate to produce motive power to move said webbing guide upward with said source of motive power; and height adjustment means operable by the vehicle occupant for selectively positioning said webbing guide and said means for moving said webbing guide at one of a plurality of predetermined positions on the vehicle.

* * * * *

UNITED STATES PATENT AND TRADEMARK OFFICE
CERTIFICATE OF CORRECTION

PATENT NO. : 5,294,150

DATED : March 15, 1994

INVENTOR(S) : Charles E. Steffens, Jr.

It is certified that error appears in the above-identified patent and that said Letters Patent is hereby corrected as shown below:

Column 11, line 49, change "restraining" to --restrain--.

Column 12, line 5, after "said" insert --member--.

Column 12, line 46, change "f" to --of--.

Column 13, line 16, change "seal" to --seat--.

Column 13, line 17, change "seal" to --seat--.

Column 14, line 7, change "responsive" to --response--.

Signed and Sealed this

Fourth Day of October, 1994

*Attest:*

BRUCE LEHMAN

*Attesting Officer*　　　*Commissioner of Patents and Trademarks*